(12) United States Patent
Oliver et al.

(10) Patent No.: US 7,561,866 B2
(45) Date of Patent: Jul. 14, 2009

(54) RFID TAGS WITH POWER RECTIFIERS THAT HAVE BIAS

(75) Inventors: Ronald A. Oliver, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 582 days.

(21) Appl. No.: 11/236,709

(22) Filed: Sep. 26, 2005

(65) Prior Publication Data
US 2006/0197668 A1    Sep. 7, 2006

Related U.S. Application Data

(60) Provisional application No. 60/655,641, filed on Feb. 22, 2005.

(51) Int. Cl.
*H04B 1/16* (2006.01)
(52) U.S. Cl. .................. 455/343.3; 455/127.5; 455/333; 327/535; 340/645; 363/61
(58) Field of Classification Search ............. 455/127.1, 455/127.5, 323, 333, 343.1–343.3; 327/534, 327/535; 340/635, 645; 363/59, 60, 61
See application file for complete search history.

(56) References Cited

U.S. PATENT DOCUMENTS

| | | | |
|---|---|---|---|
| 5,889,428 A * | 3/1999 | Young | 327/536 |
| 6,075,402 A | 6/2000 | Ghilardelli | |
| 6,163,487 A | 12/2000 | Ghilardelli | |
| 6,194,948 B1 | 2/2001 | Sclan et al. | |
| 6,918,342 B2 | 3/2001 | Kawal et al. | |
| 6,232,826 B1 | 5/2001 | Afghahi et al. | |
| 6,297,974 B1 * | 10/2001 | Ganesan et al. | 363/60 |
| 6,549,064 B2 | 4/2003 | Bandy et al. | 327/536 |
| 6,967,523 B2 * | 11/2005 | DeMone | 327/537 |
| 7,010,284 B2 * | 3/2006 | Liu et al. | 455/253.2 |
| 7,167,090 B1 | 1/2007 | Mandal et al. | |
| 2003/0146783 A1 * | 8/2003 | Bandy et al. | 327/536 |
| 2005/0088220 A1 * | 4/2005 | Hahn et al. | 327/536 |
| 2005/0162145 A1 | 7/2005 | Smith et al. | |

OTHER PUBLICATIONS

Dickson, J.F., "On-Chip High-Voltage Generation in MNOS Integrated Circuits Using an Improved Voltage Multiplier Technique", IEEE Journal of Solid-State Circuits, vol. SC-11, No. 3, Jun. 1976. pp. 374-378.

(Continued)

*Primary Examiner*—Nhan T Le
(74) *Attorney, Agent, or Firm*—Turk IP Law

(57) ABSTRACT

A system and method for generating a rectified signal in a RFID tag. An alternating signal is received by the RFID tag, and a first phase of the alternating signal is coupled to a gate and to a first non-controlling terminal of a first switching transistor. The non-controlling terminal of the first switching transistor is one of a source and a drain of the first switching transistor. A first bias voltage is applied between the first non-controlling terminal and the first gate of the first switching transistor and a rectified voltage is received between the first non-controlling terminal and a second non-controlling terminal of the first switching transistor.

30 Claims, 20 Drawing Sheets

COMPONENTS OF POWER MANAGEMENT UNIT

OTHER PUBLICATIONS

Shin, J. et al., "A New Charge Pump Without Degradation in Threshold Voltage Due to Body Effect", IEEE Journal of Solid-State Circuits, vol. 35, No. 8, Aug. 2000. pp. 1227-1230.

Wu, J. et al., "MOS Charge Pumps for Low-Voltage Operation", IEEE Journal of Solid-State Circuits, vol. 33, No. 4, Apr. 1998. pp. 592-597.

* cited by examiner

*RFID SYSTEM*

*RFID TAG*

*COMPONENTS OF POWER MANAGEMENT UNIT*

*MULTI-STAGE RECTIFIER / CHARGE PUMP CIRCUIT*

*RECTIFIER-PUMP STAGE*

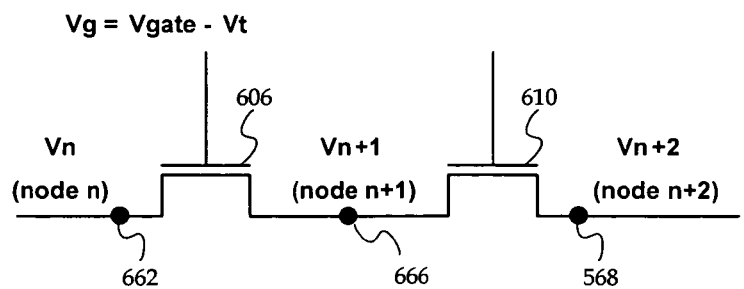
FIGURE 6B *NUMBERING OF NODES*
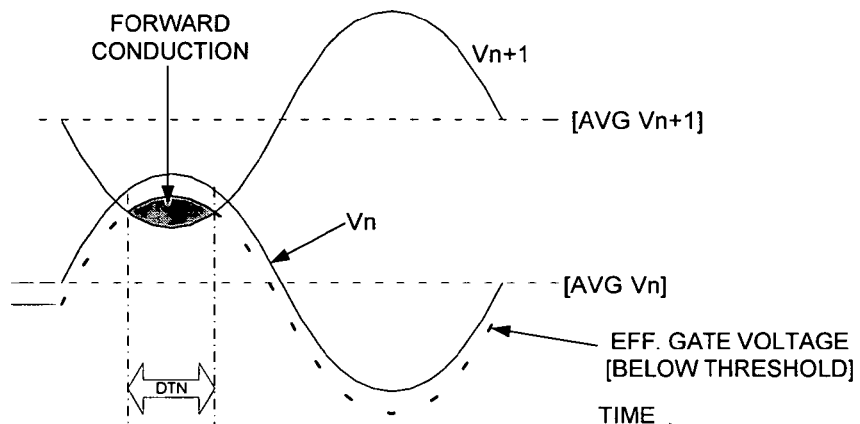
FIGURE 6C
*VOLTAGES AT SUCCESSIVE NODES*

NMOS R-P STAGE

SETTING FOR HIGH EFFICIENCY

SETTING FOR HIGH POWER

*LEAKAGE CURRENT R-P STAGE*

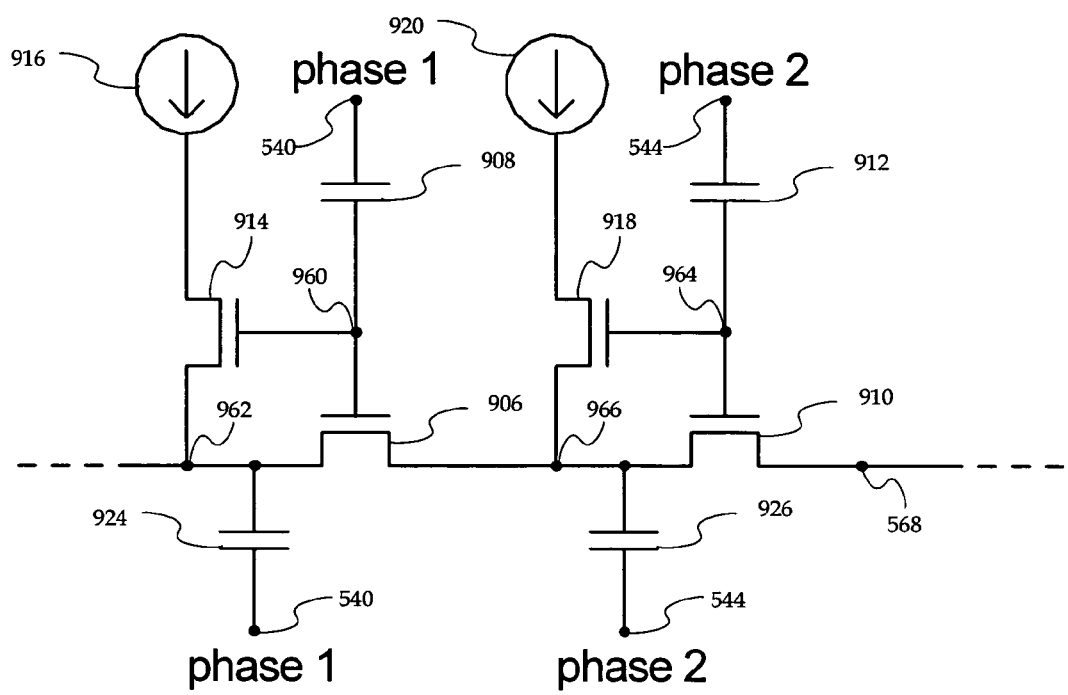
FIGURE 9  *FLOATING GATE R-P STAGE*

CURRENT MIRROR R-P STAGE

*INPUT VOLTAGE BASED CURRENT CONTROLLED R-P STAGE*

*VOLTAGE BASED CURRENT CONTROLLED R-P STAGE*

*VOLTAGE BASED OUTPUT CURRENT CONTROLLED R-P STAGE*

*CMOS R-P STAGE*

RFID TAGS WITH POWER RECTIFIERS THAT HAVE BIAS

CROSS-REFERENCE TO RELATED APPLICATION

This application claims the benefit of U.S. Provisional Application 60/655,641 entitled RFID TAG POWER RECTIFIER, filed Feb. 22, 2005, which is incorporated herein by reference.

TECHNICAL FIELD

The present description addresses the field of Radio Frequency IDentification ("RFID") systems, and more specifically, to RFID tags having at least one of voltage rectifier circuits and charge pump circuits.

BACKGROUND

RFID systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency ("RF") wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags. Passive tags include at least one of rectifier circuits and charge pump circuits for harvesting usable power from the RF signal received via the antenna system. In operation, an alternating RF wave received by the antenna system is converted by the rectifier circuits and charge pump circuits into usable direct current ("DC") voltage that can be used to power the operation of the passive RFID tag.

Harvesting sufficient power from the RF wave can be difficult since the voltage of the RF signal is in the range of approximately 200 millivolts, and a typical supply voltage for circuits of the RFID tag is one volt. Additionally, for relatively high-voltage operations in the RFID tag, such as for programming and erasing non-volatile memory in the RFID tag, a boosted voltage as high as 12 volts may be needed. Complicating matters is that the RF wave received by the RFID tag is not constantly provided, and can cease to be transmitted by the RFID reader without any notice. Thus, operation of passive RFID tags converting the low-level RF waveform to a usable voltage requires rectifiers and charge pump circuits that can generate usable voltage quickly and efficiently.

SUMMARY

One aspect provides a system and method for generating a rectified signal in a RFID tag. An alternating signal is received by the RFID tag, and a first phase of the alternating signal is coupled to a gate and to a first non-controlling terminal of a first switching transistor. The non-controlling terminal of the first switching transistor is one of a source and a drain of the first switching transistor. A first bias voltage is applied between the first non-controlling terminal and the first gate of the first switching transistor and a rectified voltage is received between the first non-controlling terminal and a second non-controlling terminal of the first switching transistor.

Another aspect provides an RFID circuit having first and second input nodes to render an alternating signal between them and a power management unit. The power management unit includes a plurality of successive stages, where each stage has first and second control nodes coupled to the first and second input nodes respectively. A first one of the stages including a first switching transistor having a gate and first and second non-controlling terminals. The non-controlling terminals of the first switching transistor being a source and a drain and the gate and the first non-controlling terminal is coupled to receive a first phase of the alternating signal from the first control node of the first stage. An additional first bias voltage is applied between the first non-controlling terminal and the gate of the first switching transistor and a rectified voltage is received between the first and the second non-controlling terminals.

BRIEF DESCRIPTION OF THE DRAWINGS

FIG. 6B is a simplified schematic drawing of the power rectifier stage of FIG. 6A. FIG. 6C illustrates an example of input signals during operation of the power rectifier stage of FIG. 6A.

FIG. 9 is a schematic drawing of at least one of the power rectifier stages of FIG. 5 according to an embodiment, where biasing is provided by a current source providing current to a reference transistor.

DETAILED DESCRIPTION

Certain details are set forth below to provide a sufficient understanding of the invention. However, it will be clear to one skilled in the art that the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
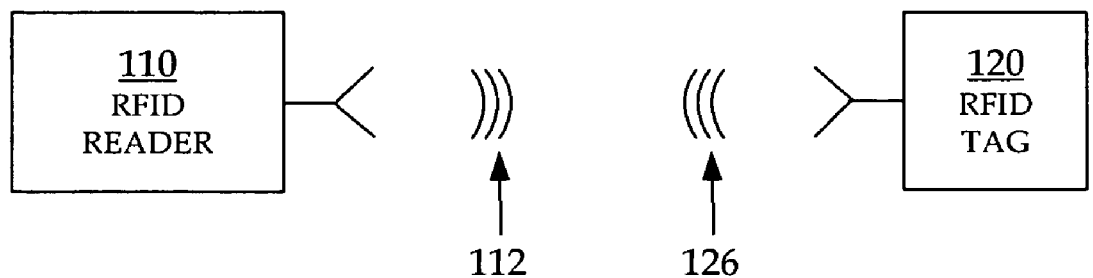
FIG. 1 is a block diagram of an RFID system.

FIG. 1 is a diagram of a typical RFID system 100, incorporating aspects of the invention. An RFID reader 110 transmits an interrogating RF wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired.

Tag 120 can be a passive tag or an active tag, i.e. having its own power source. Where tag 120 is a passive tag, it is powered from wave 112.

Figure 2:
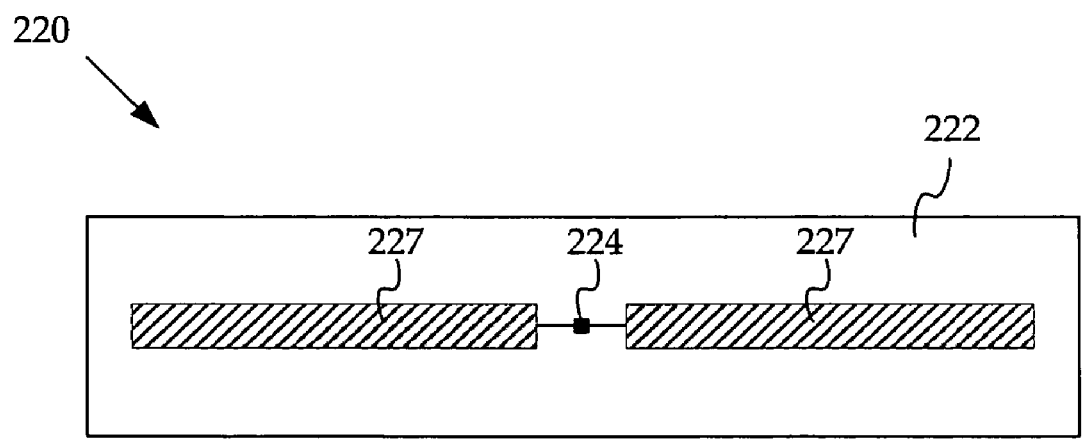
FIG. 2 is a diagram showing components of a passive RFID tag.

FIG. 2 is a diagram of an RFID tag 220. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit ("IC") 224. The IC 224 is also arranged on inlay 222, and electrically coupled to antenna segments 227. Only one method of coupling is shown, while many are possible.

In operation, a signal is received by antenna segments 227, and communicated to IC 224. The IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, as known.

Figure 3:
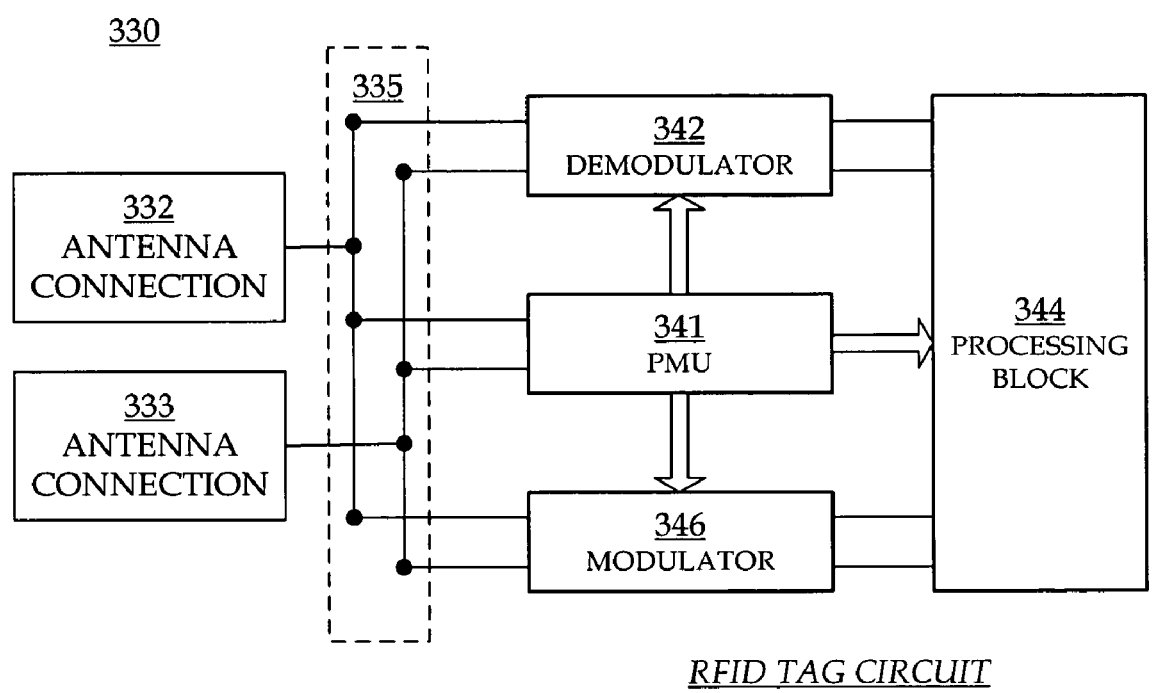
FIG. 3 is a block diagram of an implementation of an electrical circuit formed in an IC of the tag of FIG. 2.

FIG. 3 is a block diagram of an electrical circuit 330. Circuit 330 may be formed in an IC of an RFID tag, such as IC 224 of FIG. 2. Circuit 330 has a number of main components that are described in this document. Circuit 330 may have a number of additional components from what is shown and described, or different components, depending on the exact implementation.

Circuit 330 includes at least two antenna connections 332, 333, which are suitable for coupling to one or more antenna segments (not shown in FIG. 3). Antenna connections 332, 333 may be made in any suitable way, such as pads and so on. In a number of embodiments more than two antenna connections are used, especially in embodiments where more antenna segments are used.

Circuit 330 includes a section 335. Section 335 may be implemented as shown, for example as a group of nodes for proper routing of signals. In some embodiments, section 335 may be implemented otherwise, for example to include a receive/transmit switch that can route a signal, and so on.

Circuit 330 also includes a Power Management Unit ("PMU") 341. PMU 341 may be implemented in any way known in the art, for harvesting raw RF power received via antenna connections 332, 333. In some embodiments, PMU 341 includes at least one rectifier, and so on.

In operation, an RF wave received via antenna connections 332, 333 is received by PMU 341, which in turn generates power for components of circuit 330. This is true for either or both of receiving sessions (when the received RF wave carries a signal) and transmitting sessions (when the received RF wave carries no signal). More specifically, and as will be explained in more detail below, the PMU 341 includes circuitry that utilizes the alternating RF wave to generate rectified output signal that can be used to power components of the circuit 330. Additionally, the PMU 341 can include circuitry that converts alternating input signals and generates a relatively high-voltage output signal that can be used in operations where a boosted voltage is needed, for example, in programming or erasing a non-volatile memory, as known.

Circuit 330 additionally includes a demodulator 342. Demodulator 342 demodulates an RF signal received via antenna connections 332, 333. Demodulator 342 may be implemented in any way known in the art, for example including an attenuator stage, amplifier stage, and so on.

Circuit 330 further includes a processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, a memory, a decoder, an encoder, and so on.

Circuit 330 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, amplifier stage, and so on.

In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Figure 4:
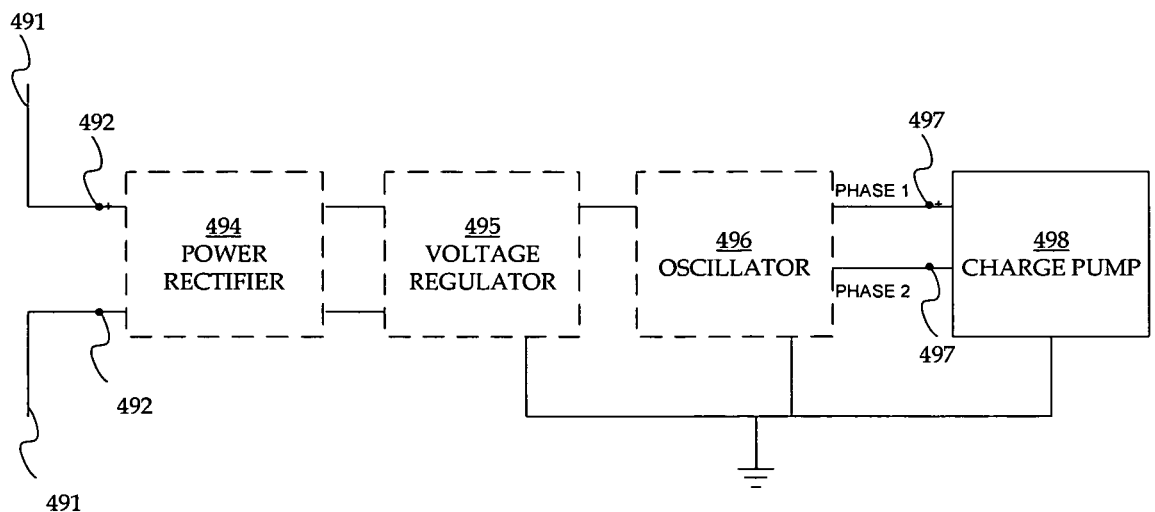
FIG. 4 is a block diagram illustrating components of a Power Management Unit of the circuit of FIG. 3.

FIG. 4 illustrates various components 441 that can be included in the PMU 341 (shown in FIG. 3). A power rectifier 494 is coupled to antenna connections 492 to receive an input RF wave detected by antenna 491. As will be explained in more detail below, the power rectifier 494 converts induced alternating current ("AC") voltage in the antenna 491 into usable DC voltage that can be used to power the operation of the RFID tag 220. A voltage regulator 495 is coupled to receive the DC voltage generated by the power rectifier 494 and provide a regulated DC voltage to other circuitry of the RFID tag 220. One such circuit that receives the regulated DC voltage is an oscillator 496 that generates two alternating signals PHASE1 and PHASE2. Typically, the PHASE1 and PHASE2 signals are complementary, that is, 180 degrees out of phase relative to one another. The PHASE1 and PHASE2 signals are provided to inputs 497 of a charge pump 498 that is coupled to the oscillator 496. As will be explained in more detail below, the charge pump 498 uses the alternating PHASE1 and PHASE2 signals to generate boosted DC voltage for use in high-voltage applications in the RFID tag 220.

As shown in FIG. 4, the various components 441 that are shown in dashed line are optionally included. For example, the power rectifier 494, the voltage regulator 495, and the oscillator 496 are optionally included in the various components 441. In such an arrangement, the inputs 497 of the charge pump 498 are coupled to the antenna connections 492 to directly receive the input RF wave, from which the charge pump 498 generates an output DC voltage.

Figure 5:
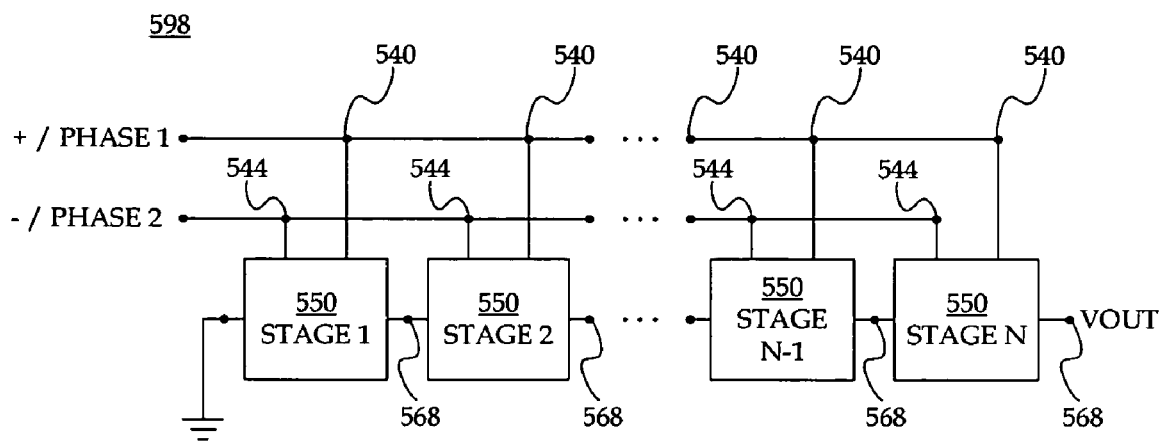
FIG. 5 is a drawing illustrating stages in a charge pump and/or a power rectifier of the diagram of FIG. 4.

FIG. 5 illustrates a multi-stage rectifier/charge pump 598 that is included in the power rectifier 494 and the charge pump 498. As previously discussed, the power rectifier 494 is used to convert induced AC voltage in the antenna into usable DC voltage to power operation of the RFID tag and the charge pump 498 is used to generate high-voltage that can used during operation of the RFID tag, such as a programming and erasing a non-volatile memory. The arrangement of the multi-stage rectifier/charge pump 598 as shown in FIG. 5 can be used to perform the voltage rectification in the power rectifier 494 and charge pumping in the charge pump 498. The multi-stage rectifier/charge pump 598 includes a plurality of stages 550, from stage 1 to stage N. The stages 550 are coupled in series, that is, with the output of a previous stage 550, represented by node 568, coupled to the input of a following stage 550. Each stage 550 receives first and second alternating signals PHASE1 and PHASE2 coupled to nodes 540 and 544, respectively. The PHASE1 and PHASE2 signals are generally out of phase relative to one another, and although not necessary for operation, are preferably 180 degrees out of phase or complementary. The PHASE1 and PHASE 2 signals represent alternating input signals generally. For example, where the multi-stage rectifier/charge pump 598 is used as a power rectifier, the PHASE1 AND PHASE2 signals can represent the induced AC voltage in the antenna. In contrast, where the multi-stage rectifier/charge pump 598 is used as a charge pump, the PHASE1 and PHASE2 signals can represent oscillating input signals generated by an oscillator, as previously described.

As will be explained in more detail below, in response to the PHASE1 and PHASE2 signals, the multi-stage rectifier/charge pump 598 provides at the output 568 of the last stage N a rectified output signal in the case for a power rectifier 494 and a high-voltage output signal in the case for a charge pump 498. Typically the stages 550 are identical in design and operation. However, different designs can be used in different stages of the multi-stage rectifier/charge pump 598 as well.

Figure 6A:
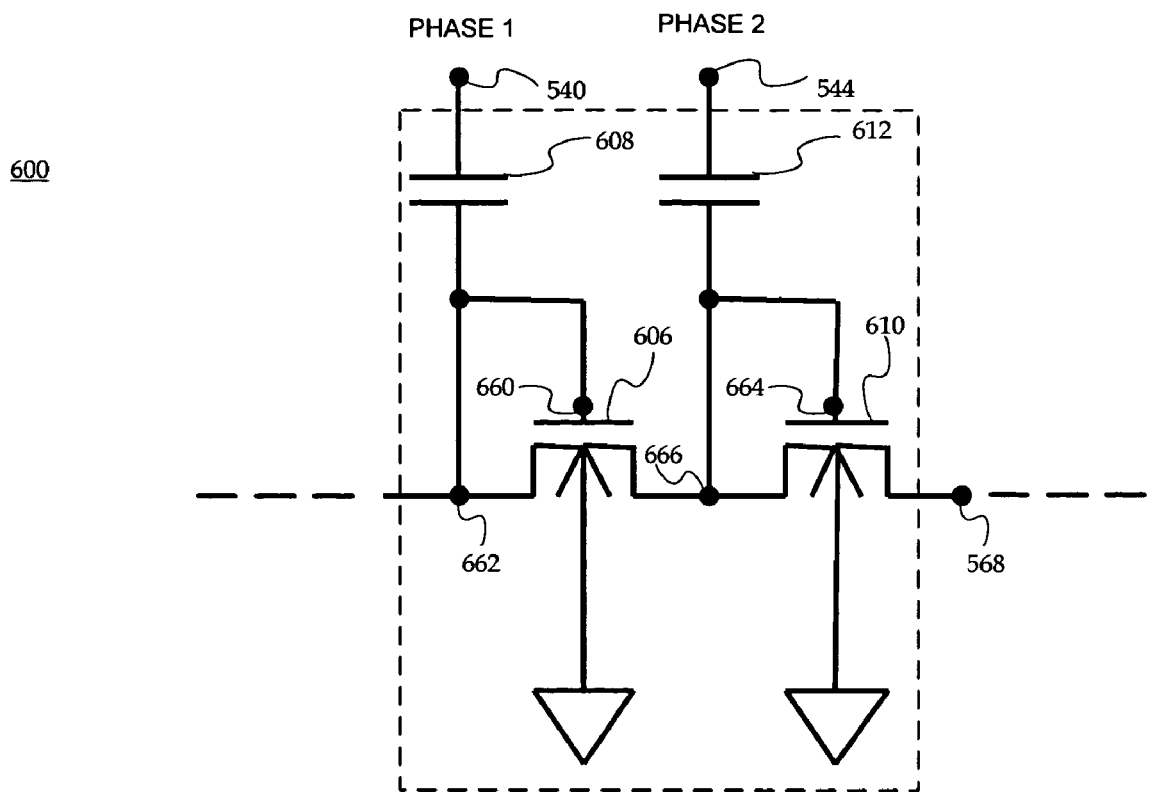
FIG. 6A is a schematic drawing of a prior art embodiment of a single power rectifier stage such as one of those depicted in FIG. 5.

FIG. 6A illustrates a conventional rectifier-pump stage 600 that can be substituted in any one of stages 550 of the multi-stage rectifier/charge pump 598 shown in FIG. 5. The rectifier-pump stage 600 includes two diode-coupled transistors 606, 610 that are coupled in series. The transistors 606, 610 are coupled to capacitors 608, 612 for capacitively coupling the PHASE1 and PHASE2 signals (applied to nodes 540 and 544, respectively) to the gates 660, 664 and the sources 662, 666, all respectively. Operation of the conventional rectifier-pump stage 600 will be described with reference to FIGS. 6B and 6C in addition to FIG. 6A. FIG. 6B is a simplified drawing of the rectifier-pump stage 600 showing transistors 606, 610, the source 662 (labeled as node n and having a voltage Vn), the source 666 (labeled as node n+1 and having a voltage Vn+1), and the output 568 (labeled as node n+2 and having a voltage Vn+2). FIG. 6C illustrates input voltages Vn and Vn+1 during operation of the rectifier-pump stage 600.

In operation, for each transistor 606, 610 current is driven forward through the respective diode-coupled transistor when (1) the threshold voltage Vt of the transistor is exceeded, and (2) the voltage at a source for a previous transistor is greater than the voltage at a source for a following transistor. For example, during a "first phase," current is driven from the source 662 through the transistor 606 (in the present example, the "previous transistor") to the source 666 of the transistor 610 (in the present example, the "following transistor") as the alternating PHASE1 signal applied to the node 540 drives the voltage of the gate 660 to exceed Vt of the transistor 606 (condition 1) and drives the voltage of the source 662 to exceed the voltage at the source 666 of the transistor 610 (condition 2). Typically, for PHASE1 and PHASE2 signals that are complementary, conditions (1) and (2) are met every cycle of the PHASE1 and PHASE2 signals for a short time where the negative voltage of the PHASE2 signal "overlaps" the positive voltage of the PHASE1 signal. This situation is illustrated in FIG. 6C, where the voltage Vn (corresponding to the PHASE1 signal) of node n exceeds the effective Vt of the transistor 606 (shown as a dashed line in FIG. 6C) and further exceeds the voltage Vn+1 (corresponding to the PHASE2 signal) of node n+1. The voltage of the PHASE1 signal the voltage of the PHASE2 signal for only the period DTN. During the short DTN period of overlapping voltages of the PHASE1 and PHASE2 signals, current is driven through the transistor 606 from the source 662 to increase the voltage at the source 666. As the PHASE1 and PHASE2 signals continue to alternate and the PHASE2 signal drives the source 666 to a voltage that is no longer less than the voltage at the source 662, the diode coupling of the transistor 606 prevents current from flowing back through the transistor 606 to decrease the voltage at the source 666.

Although not shown in FIG. 6, a next stage 550 (FIG. 5) coupled to the output of the rectifier-pump stage 600 will receive current driven through the transistor 610 from the source 666 to the output 568 during a "second phase" where the PHASE2 signal drives the voltage at the gate 664 to exceed Vt and the source 666 to exceed the voltage at the output 568, which is coupled to the source of a following transistor in the next stage 550. These conditions are met during a short time where the positive voltage of the PHASE2 signal overlaps the negative voltage of the PHASE1 signal (applied to the following transistor in the next stage 550). As the PHASE1 and PHASE2 signals continue to alternate and the second phase comes to an end, the first phase begins again and the voltage at the output 568 (driven by the PHASE1 signal applied to the gate and source of the following transistor in the next stage 550) is no longer less than the voltage at the source 666, and the diode coupling of the transistor 610 prevents current from flowing back through the transistor 610 to decrease the voltage at the output 568.

As illustrated by the previous description, by applying the alternating PHASE1 and PHASE2 signals to the rectifier-pump stage 600, current is driven through the transistors 606 and 610 in two phases to provide a rectified output signal at the output 568 having a voltage greater than the voltage of the rectified signal provided to it from a previous rectifier-pump stage 600. However, the efficiency of the rectifier-pump stage 600 is relatively poor due to the short time that the PHASE1 and PHASE2 signals drive the respective gates and sources to meet the two conditions for driving a current forward to the next source. The shortness of time is in part due to the need for the PHASE1 and PHASE2 signals to drive the gates 606 and 664 to exceed the Vt of the transistor 606 and 610, respectively. In the conventional rectifier-pump 600, the effective voltage of the PHASE1 and PHASE2 signals for driving the gate and source is reduced by the Vt of the transistor.

Figure 7A:
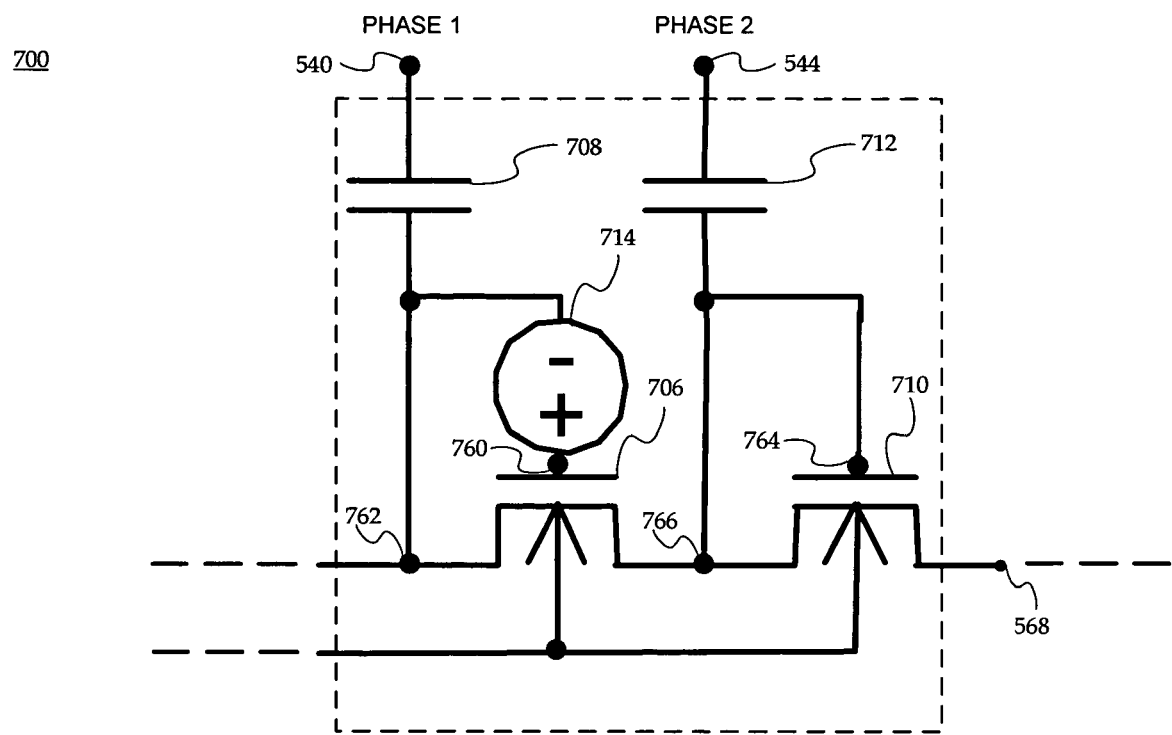
FIGS. 7A, 7B are schematic drawings of at least one of the power rectifier stages of FIG. 5 according to an embodiment, where a gate bias is provided.

FIG. 7A illustrates an embodiment of a rectifier-pump stage having a voltage bias circuit. A rectifier-pump stage 700 includes first and second n-channel metal-oxide-semiconductor ("NMOS") transistors 706, 710 having sources 762, 766 and gates 760, 764 capacitively coupled through capacitors 708, 712 to nodes 540, 544 to which the PHASE1 and PHASE2 signals are applied, all respectively. A rectified output signal having a voltage greater than an input signal applied to the source 762 is provided at the output 568 in response to the alternating PHASE1 and PHASE2 signals. In contrast to the rectifier-pump stage 600 shown in FIG. 6, the rectifier-pump stage 700 further includes a voltage bias source 714 coupled between the gate 760 and the capacitor 708 to provide a bias voltage to the gate 760. Operation of the rectifier-pump stage 700 is generally the same as the two phase operation previously described with respect to the conventional rectifier-pump stage 600. However, the bias voltage provided by the voltage bias source 714 reduces or eliminates the need for voltage of the PHASE1 signal to be used to drive the gate 760 to the Vt of the transistor 706, thereby improving efficiency over the conventional rectifier-pump stage 600. The decrease in effective driving voltage due to the Vt of the transistor 706, as previously discussed with respect to the conventional rectifier-pump stage 600, is mitigated or eliminated by the bias voltage provided by the voltage bias source 714. As a result there is greater overlap between the voltages of the PHASE1 and PHASE2 signals, and the additional voltage can be used as driving voltage at the source 762 to drive current through the transistor 706 to the source 766.

Figure 7B:
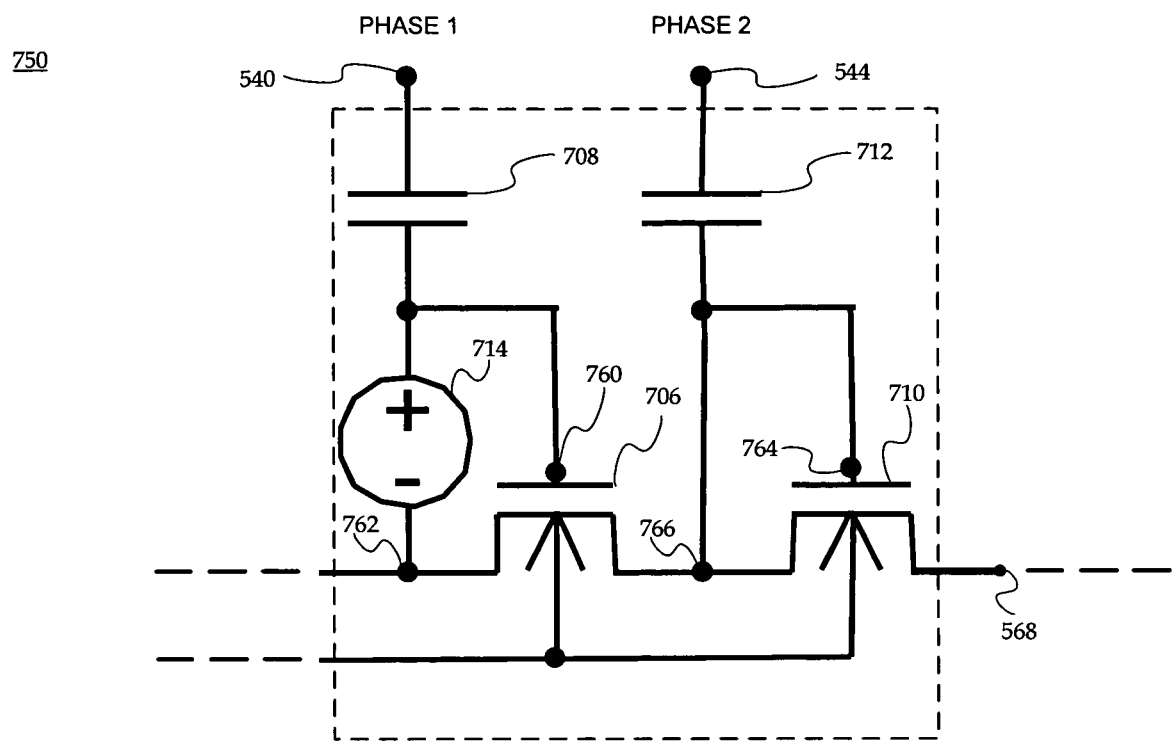

FIG. 7B illustrates another rectifier-pump stage having a voltage bias circuit. A rectifier-pump stage 750 is the same as the rectifier-pump stage 700 except that the voltage bias circuit 714 is coupled to the source 762 and the capacitor 708. The bias voltage provided by the voltage bias circuit 714 is still applied to the gate 760 to reduce the loss in driving voltage applied to the source 762 due to the Vt of the transistor 706.

Although the rectifier-pump stages 700 and 750 include only one voltage bias circuit used to bias the gate of one transistor, alternative embodiments of the invention include voltage bias circuits for the two transistors in a rectifier pump stage.

Figure 7C:
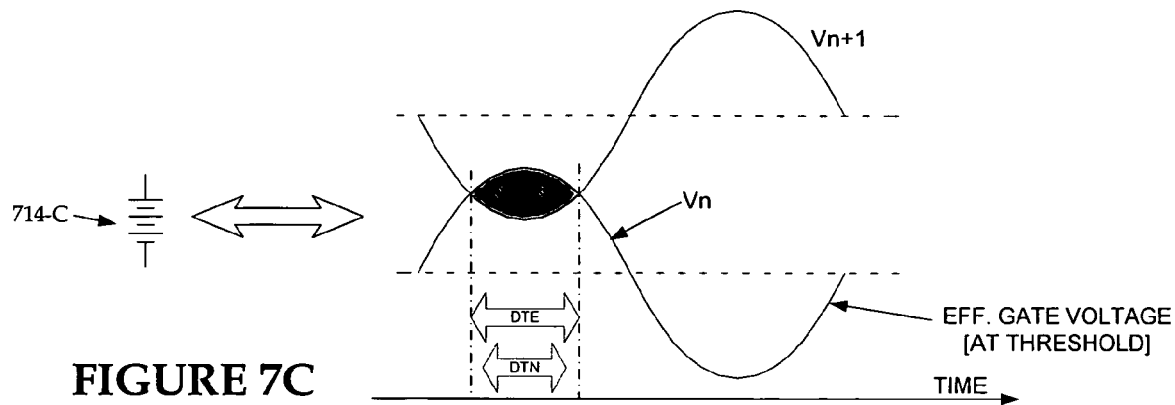
FIGS. 7C, 7D illustrate examples of input signals under different biasing conditions during operation of the power rectifier stages 7A, 7B.
Figure 7D:
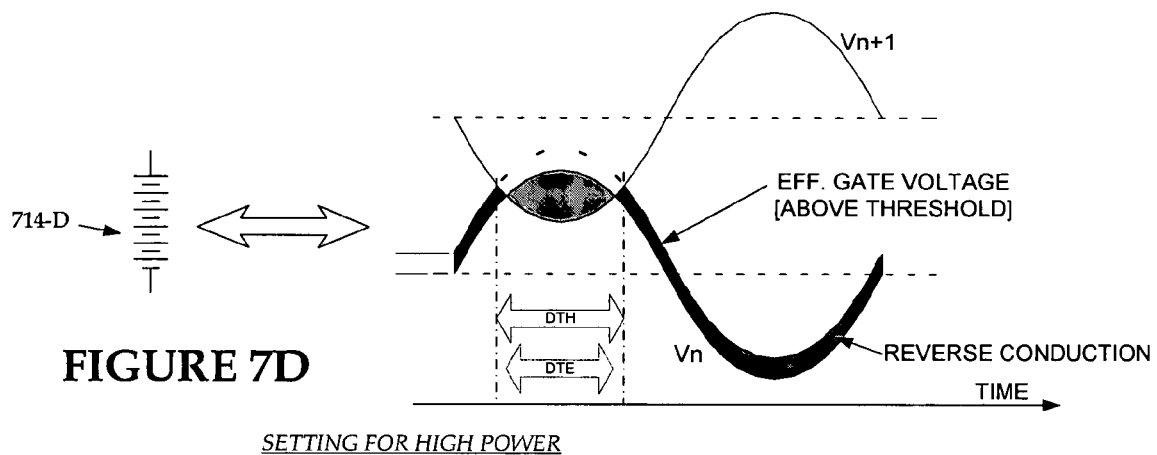

FIG. 7C illustrates a condition where the bias voltage provided by the voltage bias source 714, represented in FIG. 7C by the battery 714-C, is approximately equal to the Vt of the transistor 706. Under this condition, the period of overlap between voltage Vn (corresponding to the PHASE1 signal) and voltage Vn+1 (corresponding to the PHASE2 signal), shown in FIG. 7C as DTE, is greater in comparison to the overlap DTN for the conventional rectifier-pump stage 600 previously described with respect to FIGS. 6A, 6B AND 6C. Thus, the rectifier pump stages 700, 750 can be more efficient relative to the conventional rectifier-pump stage 600. FIG. 7D illustrates a condition where the bias voltage provided by the voltage bias source 714, represented in FIG. 7D by the battery 714-D, which is larger than the battery 714-C, is greater than the Vt of the transistor 706. Under this condition, the period of overlap between voltage Vn (corresponding to the PHASE1 signal) and voltage Vn+1 (corresponding to the PHASE2 signal), shown in FIG. 7D as DTE, is greater in comparison to the overlap DTN between the same voltages for the conventional rectifier-pump stage 600 previously described with respect to FIGS. 6A, 6B AND 6C. Additionally, due to the bias voltage being in excess of the Vt of transistor 706, reverse conduction, that is, current flow back through the transistor 706 from the source 766 to the source 762, occurs whenever there is not forward conduction. The reverse conduction allows the voltage at the source 766 to decrease. As will be described in greater detail below, in alternative embodiments an adjustable bias source or sources are included to enable the bias voltage applied to the gate of a transistor to be adjusted to optimize operation of the rectifier-pump stage. For example, under light loads the adjustable bias source can be adjusted to provide a condition similar to that depicted in and described with reference to FIG. 7C, whereas under heavy loads the adjustable bias source can be adjusted to provide a condition similar to that depicted in and described with reference to FIG. 7D.

Figure 8:
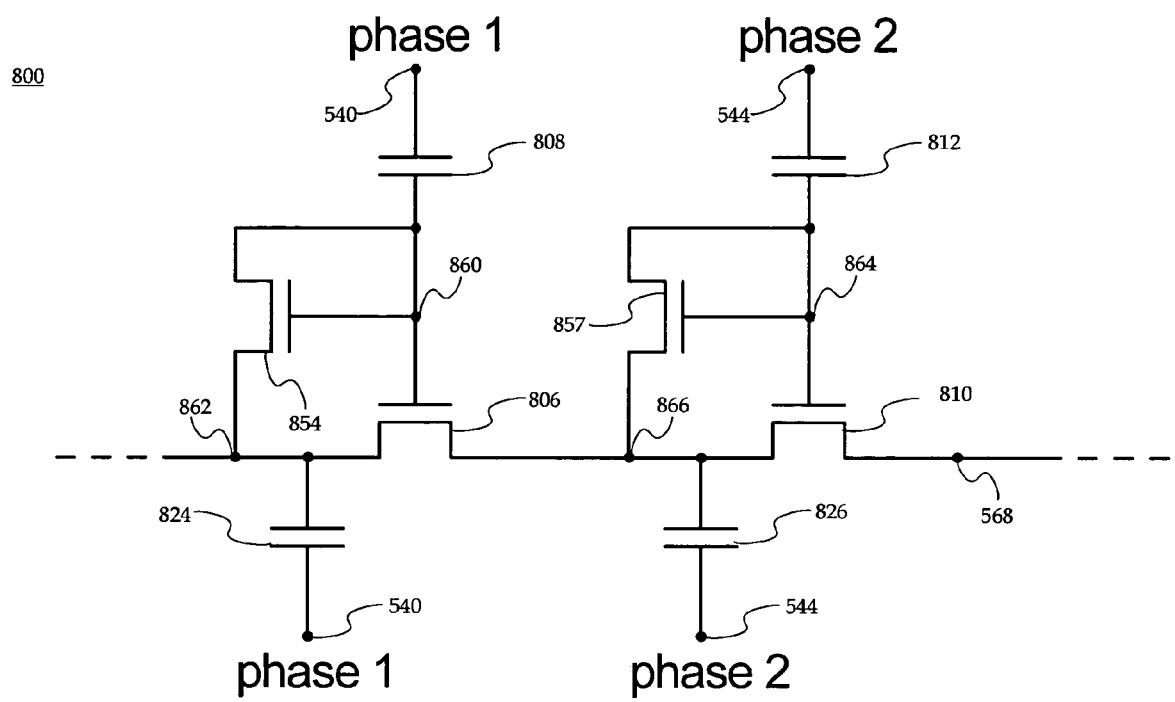
FIG. 8 is a schematic drawing of at least one of the power rectifier stages of FIG. 5 according to an embodiment where biasing is provided by a reference transistor.

FIG. 8 illustrates an embodiment of a rectifier-pump stage having two voltage bias circuits. A rectifier-pump stage 800 includes two NMOS transistors 806, 810 having gates capacitively coupled through capacitors 808, 812 to nodes 540, 544, respectively. The PHASE1 signal is applied to the node 540 and the PHASE2 signal is applied to the node 544. Sources 862, 866 of the transistors 806, 810 are also capacitively coupled to the nodes 540, 544, but through capacitors 824, 826, respectively. Using different capacitors to couple the gates 860, 864 and the sources 862 to the nodes 540, 544 increases flexibility in implementing the rectifier-pump stage 800. For example, using two sets of capacitors 807, 812 and 840, 844 allow for different sized capacitors to be used for capacitively coupling the PHASE1 and PHASE2 signals. Although there are advantages to using different capacitors for coupling the PHASE1 and PHASE2 signals to the gates 860, 864 and the sources 862, it is not required.

Diode-coupled NMOS reference transistors 854, 857 coupled between the gates 860, 864 and the sources 862, 866, represent voltage bias circuits coupled to the transistors 806, 810, respectively. The reference transistors 854, 857 are coupled to the gates 860, 864 and the sources 862, 866 to take advantage of junction leakage currents to create a source-drain voltage across the reference transistors 854, 857. By being coupled across the sources 862, 866 and the gates 860, 864, the resulting source-drain voltage of the reference transistors 854, 857 result in a bias voltage that can be used to keep the transistors 806, 810 near the Vt. Those ordinarily skilled in the art have sufficient understanding to scale the reference transistors 806, 810 accordingly to provide a desired bias voltage. Using a reference transistor and leakage currents to generate a bias voltage is suited to applications where high-voltages relative to the substrate are applied to the source and drains of the reference transistor. Under these conditions, leakage currents are typically present, and providing the reference transistor takes advantage of the naturally occurring leakage currents.

FIG. 9 illustrates another embodiment of a rectifier-pump stage. A rectifier-pump stage 900 includes two NMOS transistors 906, 910 having gates capacitively coupled through capacitors 908, 912 to nodes 540, 544, respectively. The PHASE1 signal is applied to the node 540 and the PHASE2 signal is applied to the node 544. Sources 962, 966 of the transistors 906, 910 are capacitively coupled to the nodes 540, 544 through capacitors 924, 926, respectively.

Reference transistors 914, 918 and current sources 916, 920 represent voltage bias circuits coupled to the transistors 906, 910, respectively. The reference transistors 914, 918 have gates coupled to the gates 960, 964 and the capacitors 908, 912, respectively, in a manner that creates floating gates that are electrically isolated and that can store injected charge. The current sources 916, 920 provide tunneling currents that are used to inject sufficient charge into the floating gate to create bias voltage that is applied to the gates 960, 964. The tunneling currents can be enabled at manufacture to sufficiently charge the floating gates to provide a bias voltage that can be used to keep the transistors 906, 910 near the Vt. Alternatively, or additionally, the tunneling currents can be enabled periodically to establish and maintain the quantity of charge on the floating gate to provide sufficient bias voltage to the gates 960, 964. Using a reference transistor having a floating gate and tunneling current to generate a bias voltage has the advantage that once sufficient charge is injected into the floating gate, a constant current is not wasted in generated the bias voltage for the gates 960, 964.

Figure 10A:
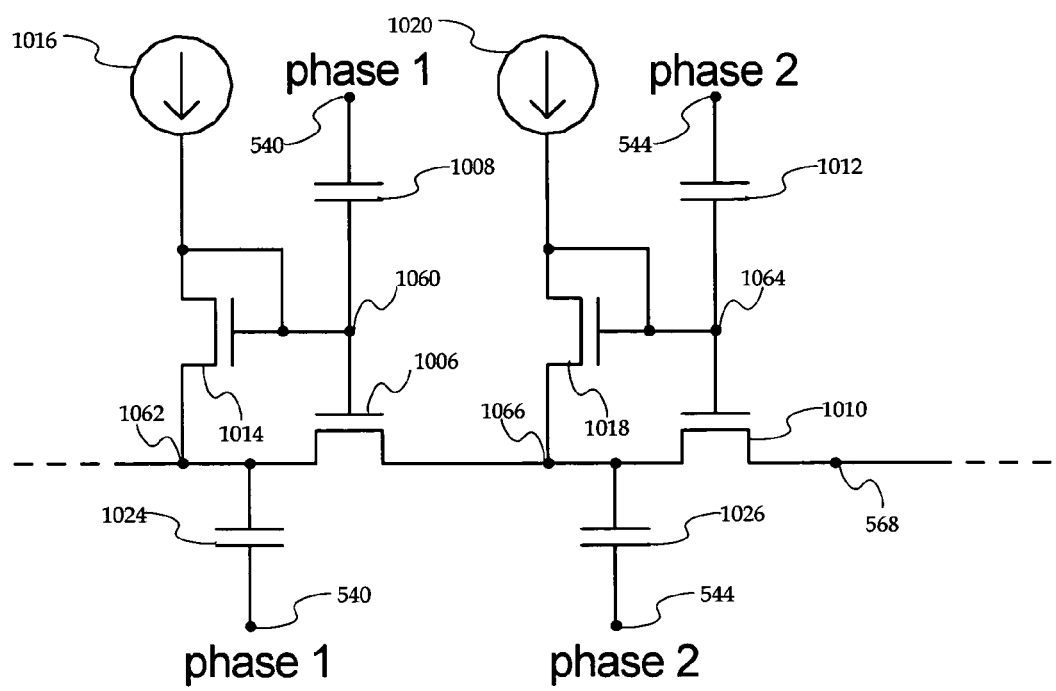
FIGS. 10A, 10B are schematic drawings of at least one of the power rectifier stages of FIG. 5 according to an embodiment, where gate bias voltages are provided using bias current sources.

FIG. 10A illustrates an embodiment of a rectifier-pump stage using a bias current and reference transistors to provide bias voltage. A rectifier-pump stage 1000 includes two NMOS transistors 1006, 1010 having gates capacitively coupled through capacitors 1008, 1012 to nodes 540, 544, respectively. The PHASE1 signal is applied to the node 540 and the PHASE2 signal is applied to the node 544. Sources 1062, 1066 of the transistors 1006, 1010 are capacitively coupled to the nodes 540, 544 through capacitors 1024, 1026, respectively. Reference transistors 1014, 1018 and current sources 1016, 1020 represent voltage bias circuits coupled to the transistors 1006, 1010, respectively. The reference transistors 1014, 1018 have gates and sources coupled to the gates 1060, 1064, respectively, in a manner that forms current mirror circuits with the transistors 1006, 1010. The current sources 916, 920 provide reference currents that flow through the reference transistors 1014, 1018 and are "mirrored" at the gates 1060, 1064, thereby creating a bias voltage that can be used to keep the transistors 1006, 1010 near the Vt.

Figure 10B:
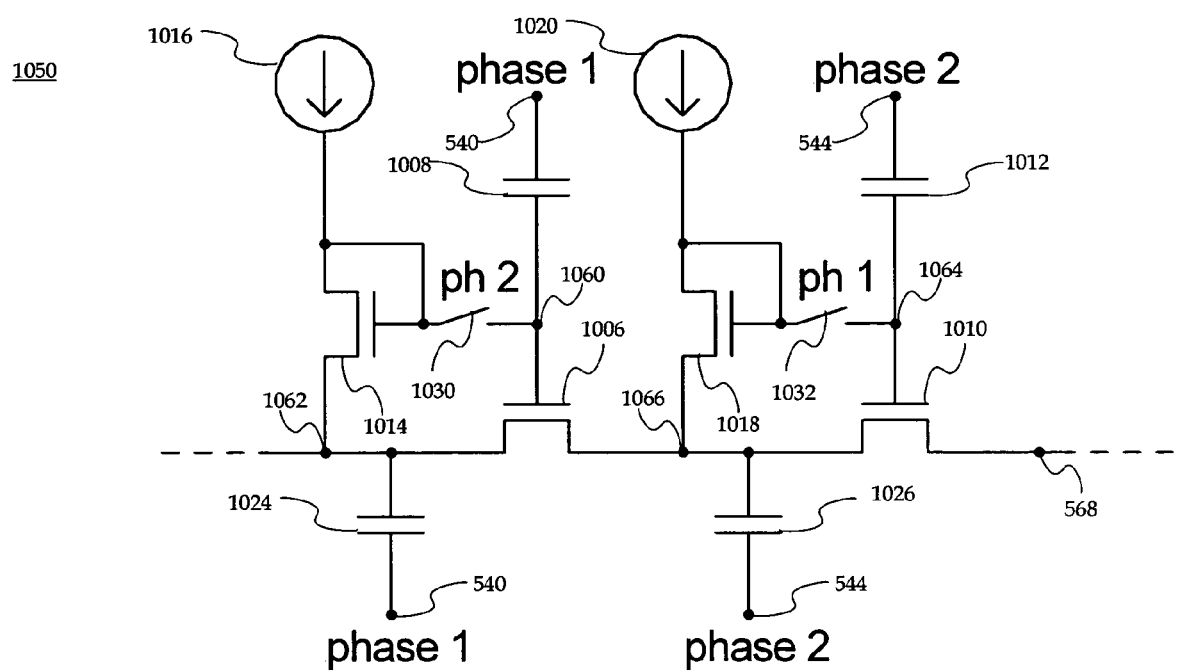

FIG. 10B illustrates another embodiment of a rectifier-pump stage that uses a bias current and reference transistors to provide bias voltage. A rectifier-pump stage 1050 is similar to the rectifier-pump stage 1000 except that the gates of the transistors 1014, 1018 are coupled to the gates 1060, 1064 through clocked switches 1030, 1032, respectively. The switch 1030 is clocked, that is, switched open and closed, by the PHASE2 signal and the 1032 is clocked by the PHASE1 signal. In this manner, the reference transistors 1014, 1018 are used in a switched capacitor application for providing the bias voltage to the gates 1060, 1064. The switched capacitor arrangement allows the use of lower frequency PHASE1 and PHASE2 signals while avoiding excessively large capacitor sizes. Additionally, the switched capacitor arrangement of the rectifier-pump stage 1050 prevents possible backflow problems into bias current sources 1016, 1020.

Both the rectifier-pump stages 1000 and 1050 have the advantage of quickly generating bias voltages for the gates of the transistors 1060, 1064 through the use of current sources 1016, 1020, which reduces the time necessary to generate an output having sufficient voltage.

Figure 11A:
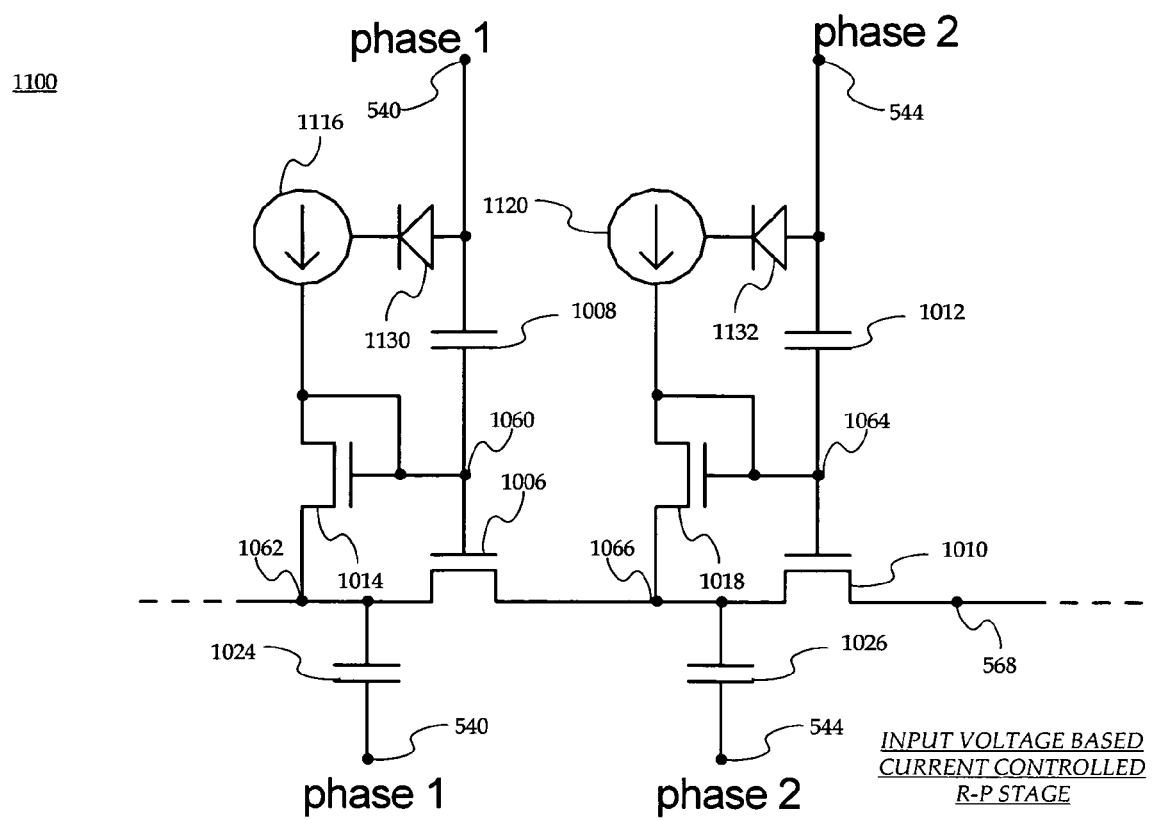
FIGS. 11A, 11B are schematic drawings of at least one of the power rectifier stages of FIG. 5 according to an embodiment, where gate bias voltages are provided using adjustable bias current sources adjusted based on voltage amplitudes of input signals.

FIG. 11A illustrates an embodiment of a rectifier-pump stage having adjustable bias current and reference transistors to provide bias voltage. A rectifier-pump stage 1100 is similar to the rectifier-pump stage 1000, except that the current sources 1116, 1120 are adjustable to provide adjustment of the bias current applied to the reference transistors 1014, 1018, and consequently, adjustment of the bias voltage applied to the transistors 1006, 1010. As shown in FIG. 11A, the adjustable current sources 1116, 1120 are adjusted based on the maximum amplitude of the PHASE1 and PHASE2 signals detected by envelop detector circuits 1130, 1132. Various current-to-voltage relationships between the bias current and the maximum amplitude of the PHASE1 and PHASE2 signals can be established using the arrangement of the rectifier-pump stage 1100. For example, in one embodiment, the bias currents from the adjustable current sources 1116, 1120 can be increased in response to increasing maximum amplitude. As a result, the bias voltages applied to the reference transistors 1014, 1018 are increased in response to higher amplitude PHASE1 and PHASE2 signals. Where the maximum amplitude for the PHASE1 and PHASE2 continues to increase, the bias current may eventually be great enough to generate a bias voltage in excess of the Vt of the transistors 1006, 1010 resulting in a condition for reverse conduction that allows current to flow back through the transistors. Allowing current to be bled back through the transistors to reduce the voltage at the sources 1062, 1066 may be desirable in order to avoid exceeding a breakdown voltage for the gate oxides of the transistors 1006, 1010. In other embodiments, the adjustment of the bias current of the adjustable current sources 1116, 1120 may be the opposite as previously described. In another embodiment, the bias currents of the current sources 1116, 1120 can be adjusted to vary the bias voltage applied to the gates 1006, 1064 based on loading or efficiency. For example, given a light load where demand for power is relatively low, the bias current can be adjusted to provide less bias voltage, thereby reducing the efficiency of the rectifier-pump stage. In contrast, given a heavy load where the demand for power is high, the bias current can be adjusted to provide a bias voltage that maximizes efficiency of the rectifier-pump stage. As illustrated by the previous examples, the current-to-voltage relationship can be tailored as desired.

Figure 11B:
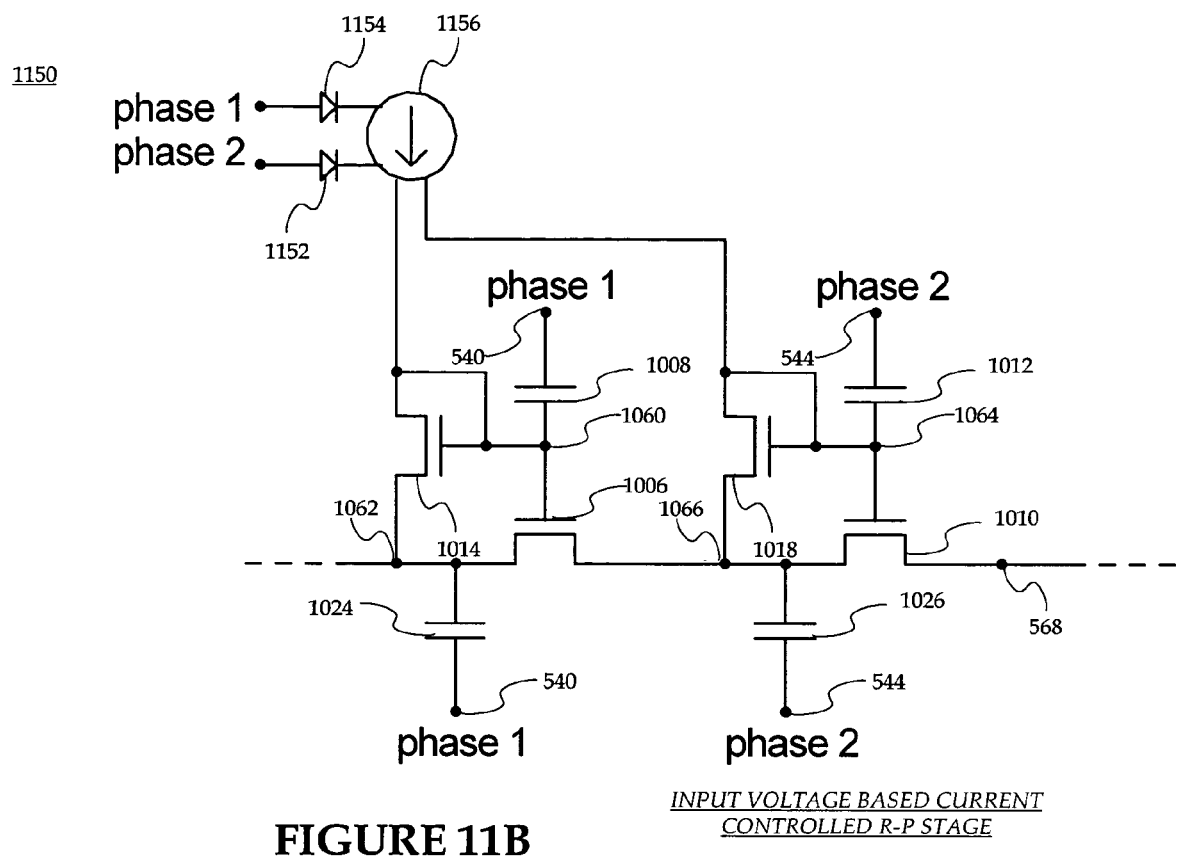

FIG. 11B illustrates another embodiment of a rectifier-pump stage having adjustable bias currents and reference transistors to provide bias voltage. A rectifier-pump stage 1150 is similar to the rectifier-pump stage 1100 previously described with respect to FIG. 11A, except that a single adjustable current source 1156 is used to provide a bias current to both reference transistors 1014, 1018. The bias current provided by the adjustable current source 1156 is adjusted based on the maximum amplitudes of both the PHASE1 and PHASE2 signals as detected by envelope detector circuits 1152, 1154. The detected amplitudes of the PHASE1 and PHASE2 signals can be averaged or weighted to adjust the bias current provided by the adjustable current source 1156 to the reference transistors 1014, 1018.

Figure 12A:
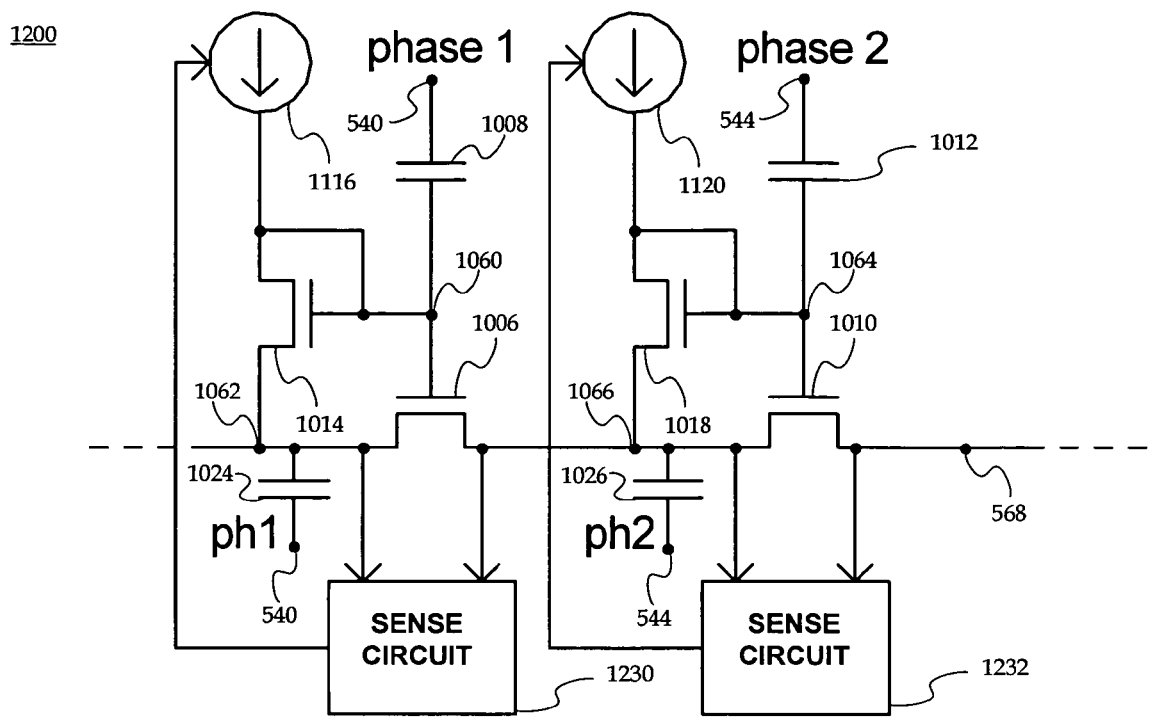
FIGS. 12A, 12B are schematic drawings of at least one of the power rectifier stages of FIG. 5 according to an embodiment, where gate bias voltages are provided using adjustable bias current sources adjusted based on voltage amplitudes of output signals.

FIG. 12A illustrates another embodiment of a rectifier-pump stage having adjustable bias currents and reference transistors for providing bias voltage. A rectifier-pump stage 1200 is similar to the rectifier-pump stage 1000, except that the current sources 1116, 1120 are adjustable to adjust the bias current applied to the reference transistors 1014, 1018. As shown in FIG. 12A, the adjustable current sources 1116, 1120 are adjusted based on at least one of a voltage difference across and a current through the transistors 1006, 1010 as sensed by sense circuits 1230, 1232, all respectively. Various relationships between the bias current and the sensed voltage and current can be established using the arrangement of the rectifier-pump stage 1200 as previously described with respect to rectifier-pump stage 1000. The current-to-voltage and current-to-current relationships can be tailored to provide desired operation.

Figure 12B:
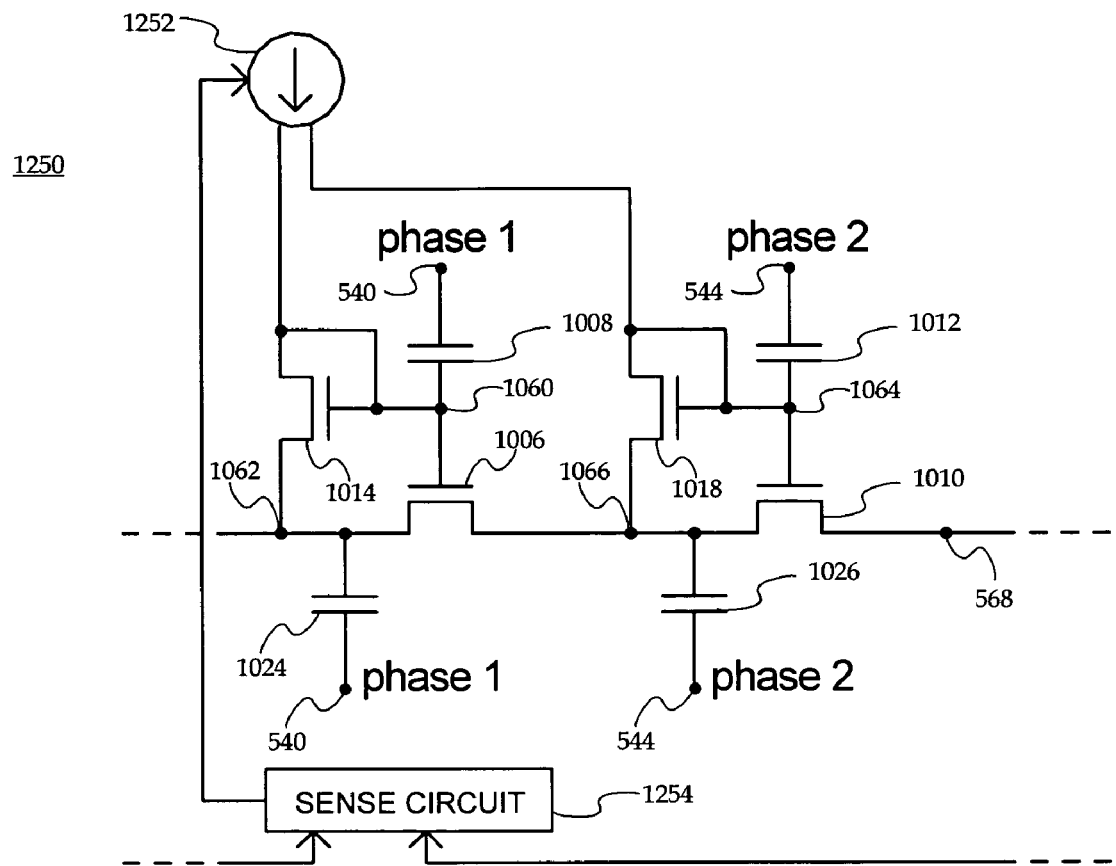

FIG. 12B illustrates another embodiment of a rectifier-pump stage having adjustable bias currents and reference transistors for providing bias voltage. A rectifier-pump stage 1250 is similar to the rectifier-pump stage 1200 previously described with respect to FIG. 12A, except that a single adjustable current source 1252 is used to provide a bias current to both reference transistors 1014, 1018. The bias current provided by the adjustable current source 1156 is adjusted based on at least one of a voltage and current sensed across one or more rectifier-pump stages as sensed by sense circuit 1254.

Figure 13A:
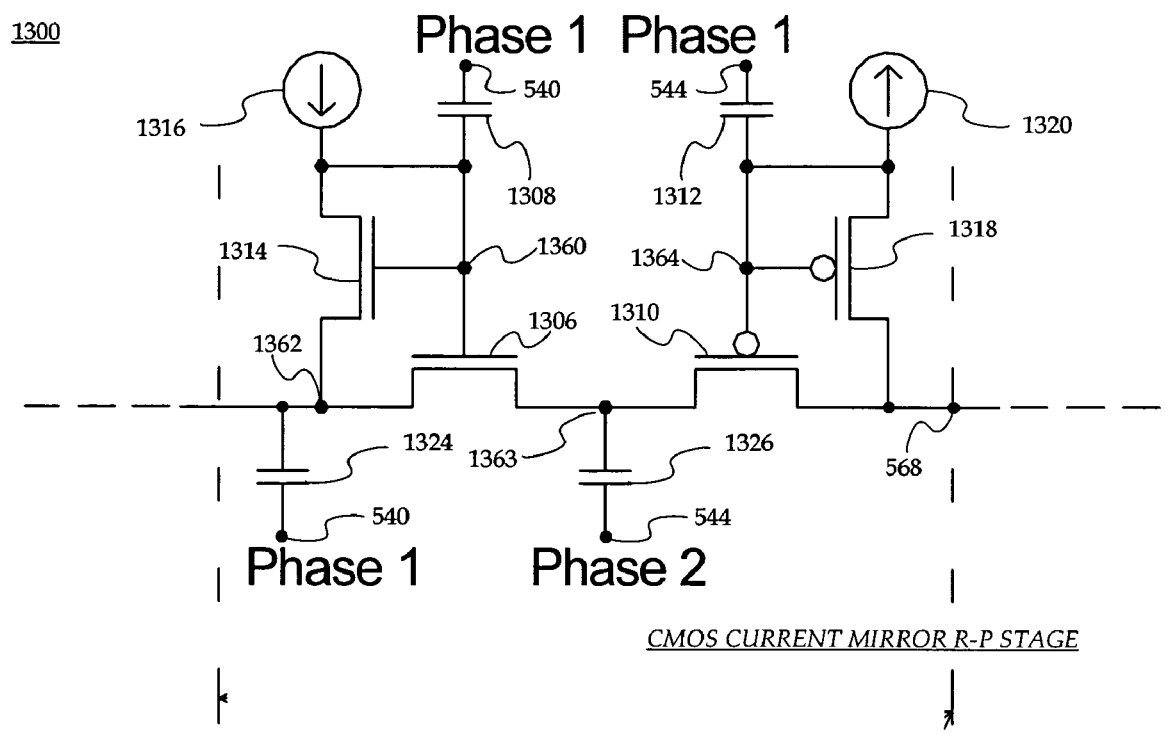
FIGS. 13A, 13B are schematic drawings of at least one of the power rectifier stages of FIG. 5 according to an embodiment, where complementary transistors are utilized.

FIG. 13A illustrates another embodiment of a rectifier-pump stage using bias currents and reference transistors for providing bias voltage. A rectifier-pump stage 1300 includes a pair of complementary metal-oxide-semiconductor ("CMOS") switching transistors 1306, 1310. The gates of the transistors 1306, 1310 are capacitively coupled through capacitors 1308, 1312 to receive the PHASE1 signal. Capacitors 1324, 1326 are coupled to the transistors 1306, 1310 to capacitively couple the PHASE1 and PHASE2 signals to a source 1362 and a drain 1363. A voltage bias circuit providing a bias voltage for the transistor 1306 includes a NMOS reference transistor 1314 and a current source 1316, and a voltage bias circuit providing a bias voltage for the transistor 1310 includes a p-channel metal-oxide-semiconductor ("PMOS") reference transistor 1318 and a current source 1320.

In contrast to the previously discussed embodiments of rectifier-pump stages, the rectifier-pump stage 1300 utilizes both NMOS and PMOS transistors for both switching and voltage biasing purposes. By having the arrangement of NMOS and PMOS transistors of the rectifier-pump stage 1300, the gates 1360, 1364 of the transistors 1306, 1310 can be driven by the same signal, either PHASE1 or PHASE2. In the embodiment shown in FIG. 13A, the PHASE1 signal is used to drive the gates 1360, 1364. Operation of the rectifier-pump stage 1300 is the same as previously described. That is, a rectified output signal having a voltage greater than the voltage of an input signal is provided at the output 568 in response to the alternating PHASE1 and PHASE2 signals.

Figure 13B:
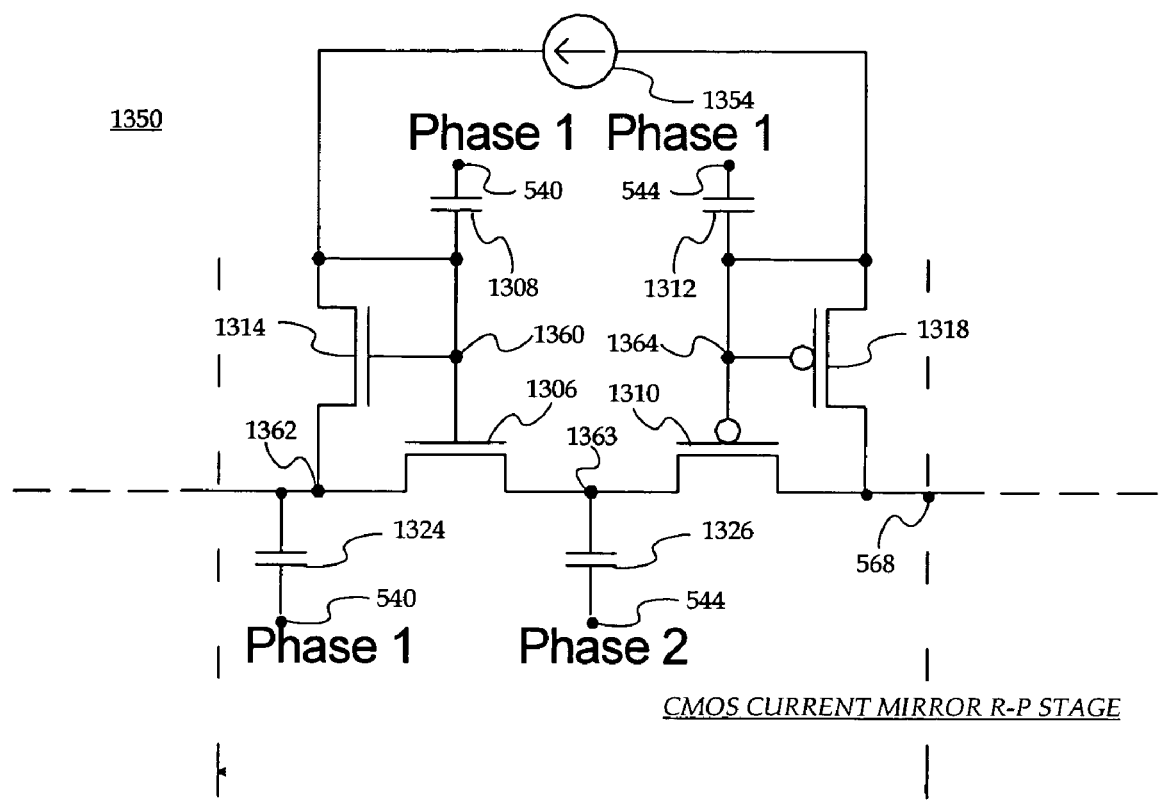

FIG. 13B illustrates another embodiment of a rectifier-pump stage using a bias current and reference transistors for providing bias voltage. A rectifier-pump stage 1350 is similar to the rectifier-pump stage 1300 previously described with respect to FIG. 13A, except that a single current source 1354 is used to provide a bias current to both reference transistors 1314, 1318. Although not specifically shown in FIGS. 13A and 13B, the current sources can be adjustable to provide adjustment of the bias voltages, as previously described with respect to rectifier-pump stages 1100, 1150, 1200, 1250.

Figure 14:
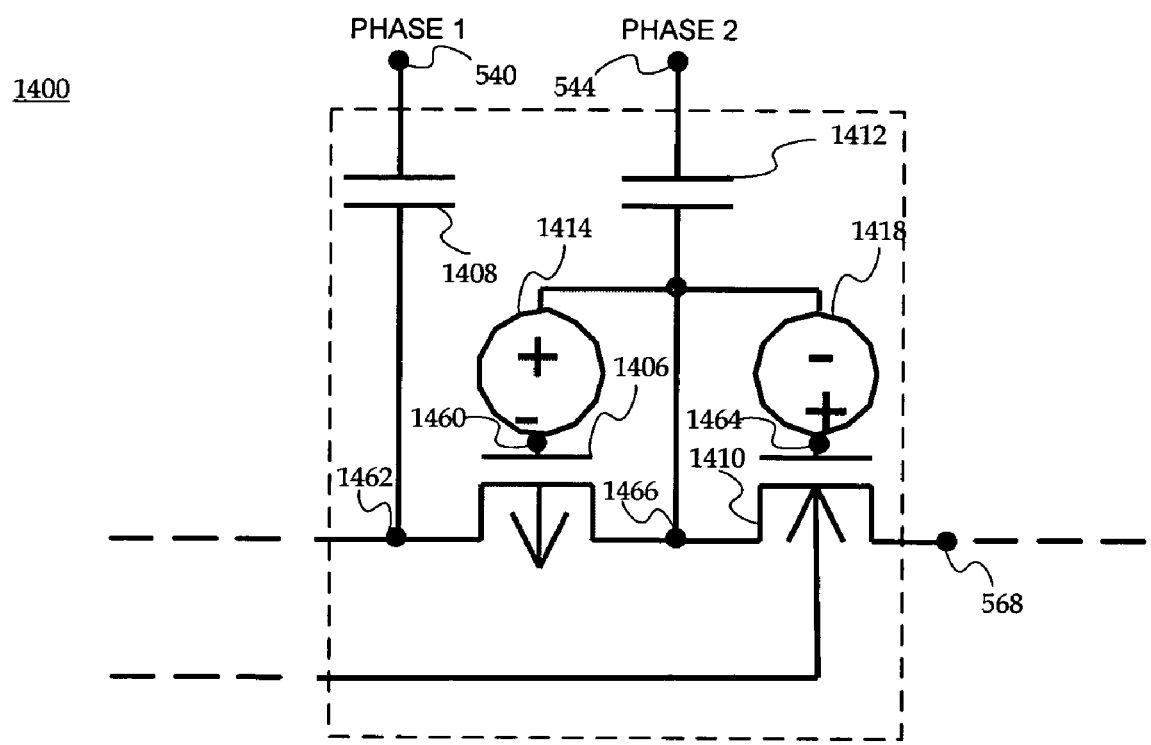
FIG. 14 is a schematic drawing of at least one of the power rectifier stages of FIG. 5 according to another embodiment.

FIG. 14 illustrates another embodiment of a rectifier-pump stage having a voltage bias circuit for providing bias voltage. A rectifier-pump stage 1400 includes CMOS switching transistors 1406, 1410 having gates 1460, 1464 and drain 1466 that are capacitively coupled through capacitor 1412 to receive a driving signal. As shown in FIG. 14, the PHASE2 signal is used as the driving signal, however, the PHASE1 signal can be used as well where the PHASE2 signal is capacitively coupled to source 1462 through capacitor 1408. Voltage bias circuits 1414, 1418 are coupled to the gates 1460, 1464 to provide bias voltages thereto. Operation of the rectifier-pump stage 1400 is the same as for the previously described embodiments of rectifier-pump stages.

Although several elements of the different embodiments of the rectifier-pump stages previously described have been described as being the "same" or "similar," it will be appreciated by those ordinarily skilled in the art that minor modifications may be made to tailor or optimize elements for application in a particular embodiment of the rectifier-pump stage without departing from the scope of the present invention. Additionally, some or all of the principles described with respect to one embodiment of a rectifier-pump circuit can be applied to a different embodiment of a rectifier-pump circuit. For example, the description of adjusting bias voltage applied to the gates of switching transistors to accommodate different loads and input voltage amplitudes by adjusting the bias current, including biasing the gates in excess of the Vt so that current can flow back through the switching transistor, can be applied to the other embodiments utilizing an adjustable current source and reference transistor to provide bias voltage. Another example is providing an adjustable current source or sources in the embodiments of rectifier-pump stages 1300 and 1350. Moreover, with respect to the embodiments having less than a one-to-one correspondence between a current source and reference transistor, it will be appreciated that a common current source can be used to provide a bias current to the reference transistors of more than one rectifier-pump stage.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An RFID circuit comprising:
    first and second input nodes to render an alternating signal between them; and
    a power management unit having a plurality of successive stages, each stage having first and second control nodes coupled to the first and second input nodes respectively, a first one of the stages including:
    a first switching transistor having a gate and first and second non-controlling terminals, the non-controlling terminals of the first switching transistor being a source and a drain, the gate and the first non-controlling terminal being coupled to receive a first phase of the alternating signal from the first control node of the first stage, and
    wherein an additional first bias voltage is adapted to be applied between the first non-controlling terminal and the gate of the first switching transistor, and
    wherein a rectified voltage is adapted to be received between the first and the second non-controlling terminals.

2. The RFID circuit of claim 1, further comprising:
first and second antenna pads coupled respectively to the first and second input nodes, the first and second antenna pads adapted to be coupled to REID antenna segments.

3. The RFID circuit of claim 1, further comprising:
an oscillator coupled to output to the input nodes two phases that present the alternating signal in relation to each other.

4. The RFID circuit of claim 1, wherein the stages are identical.

5. The RFID circuit of claim 1, wherein the bias voltage is adjustable.

6. The RFID circuit of claim 1, wherein the first stage further includes a first capacitor coupled between the first control node and the gate and the first non-controlling terminal of the first switching transistor.

7. The RFID circuit of claim 1, wherein the first stage further includes a first capacitor coupled between the first control node and the gate of the first switching transistor; and
a second capacitor coupled between the first control node and the first non-controlling terminal of the first switching transistor.

8. The RFID circuit of claim 1, wherein the first stage further includes a bias circuit adapted to provide the bias voltage.

9. The RFID circuit of claim 8, wherein the bias circuit includes a reference transistor having a first terminal coupled to the gate of the first switching transistor and a second terminal coupled to the first non-controlling terminal of the first transistor.

10. The RFID circuit of claim 9, wherein the first terminal of the reference transistor is a gate of the reference transistor.

11. The RFID circuit of claim 9, wherein the reference transistor also has a third terminal that is shorted to one of the first terminals and the second terminals.

12. The RFID circuit of claim 9, wherein the reference transistor also has a third terminal that is adapted to receive a bias current.

13. The RFID circuit of claim 12, wherein the bias current is adapted to be in phase with the first phase of the alternating current.

14. The RFID circuit of claim 12, wherein the bias circuit further includes a current source for applying the bias current.

15. The RFID circuit of claim 14, wherein the first terminal of the reference transistor is a gate and a floating gate is formed with the gate of the first switching transistor, the current source providing a tunneling current to the reference transistor.

16. The RFID circuit of claim 14, wherein the third terminal and first terminals of the reference transistor are coupled.

17. The RFID circuit of claim 16, wherein the first terminal of the reference transistor is coupled to the gate of the first switching transistor through a switch.

18. The RFID circuit of claim 14, wherein the current source is an adjustable current source for applying an adjustable bias current.

19. The RFID circuit of claim 18, wherein the bias circuit further includes an envelope detector for determining an amplitude of the alternating signal and generating a control signal to adjust the current source based on the amplitude.

20. The RFID circuit of claim 18, wherein the bias circuit further includes a voltage sensing circuit coupled to the first switching transistor, the voltage sensing circuit for generating a control signal to adjust the current source based on a voltage across the first switching transistor.

21. The RFID circuit of claim 18, wherein the bias circuit further includes a current sensing circuit coupled to the first switching transistor, the current sensing circuit for generating a control signal to adjust the current source based on a current of the first switching transistor.

22. The RFID circuit of claim 1, wherein the first stage further includes a second switching transistor having a gate and a first non-controlling terminal coupled to receive a second phase of the alternating signal from the second control node of the first stage, the non-controlling terminal of the second switching transistor being one of a source and a drain of the second switching transistor, and
wherein the first non-controlling terminal of the second switching transistor is coupled with the second non-controlling terminal of the first switching transistor,
an additional second bias voltage is adapted to be applied between the first non-controlling terminal and the gate of the second switching transistor, and
wherein the rectified voltage is adapted to be received between the first non-controlling terminal of the first switching transistor and the second non-controlling terminal of the second switching transistor.

23. The RFID circuit of claim 22, wherein the first switching transistor comprises a n-channel field effect transistor and the second switching transistor comprises a n-channel field effect transistor, and the RFID circuit further comprises:
a first bias circuit adapted to provide the first bias voltage; and
a second bias circuit adapted to provide the second bias voltage.

24. The RFID circuit of claim 1, wherein the first stage further includes a second switching transistor having a gate, the second switching transistor also having a first non-controlling terminal coupled to receive a second phase of the alternating signal from the second control node of the first stage, the non-controlling terminal of the second switching transistor being one of a source and a drain of the second switching transistor, and
wherein the first non-controlling terminal of the second switching transistor is coupled with the second non-controlling terminal of the first switching transistor,
an additional second bias voltage is adapted to be applied between the second non-controlling terminal and the gate of the second switching transistor, and
wherein the rectified voltage is adapted to be received between the first non-controlling terminal of the first switching transistor and the second non-controlling terminal of the second switching transistor.

25. The RFID circuit of claim 24, wherein the first switching transistor comprises a n-channel field effect transistor and the second switching transistor comprises a p-channel field effect transistor, and the RFID circuit further comprises:
a first bias circuit adapted to provide the first bias voltage; and
a second bias circuit adapted to provide the second bias voltage.

26. The RFJD circuit of claim 25, wherein the first bias circuit includes a first reference transistor having a first terminal coupled to the gate of the n-channel field effect transistor and a second terminal coupled to the first non-controlling terminal of the first transistor and wherein the second bias circuit includes a second reference transistor having a terminal coupled to the gate of the p-channel field effect transistor and a second terminal coupled to the second non-controlling terminal of the second transistor.

27. The RFID circuit of claim 26, wherein the first and second reference transistors have third terminals adapted to receive a respective bias current.

28. The RFID circuit of claim 27, wherein the bias current received by the third terminal of the first reference transistor is provided by a first current source and the bias current received by the third terminal of the second reference transistor is provided by a second current source.

29. The RFID circuit of claim 28, wherein the first and second current sources are the same current source.

30. The RFID circuit of claim 28, wherein the first and second current sources are adjustable to provide respective adjustable bias currents.

* * * * *

UNITED STATES PATENT AND TRADEMARK OFFICE
CERTIFICATE OF CORRECTION

PATENT NO. : 7,561,866 B2  
APPLICATION NO. : 11/236709  
DATED : July 14, 2009  
INVENTOR(S) : Ronald A. Oliver Page 1 of 1

It is certified that error appears in the above-identified patent and that said Letters Patent is hereby corrected as shown below:

On title page item (56)

Please delete "Sclan et al." on page 1, column 2, after "6,194,948 B1 212001" and insert --Scian et al.--, therefor.

Please delete "6,918,342 B2 3/2001 Kawai et al." on page 1, column 2, and insert --6,918,342 B2 7/2005 Sauder et al.--, therefor.

Please delete "REID" in claim 2, column 13, line 4 and insert --RFID--, therefor.

Please delete "RFJD" in claim 26, column 14, line 56 and insert --RFID--, therefor.

Please delete "RFJD" in claim 28, column 15, line 1 and insert --RFID--, therefor.

Signed and Sealed this

Seventeenth Day of November, 2009

David J. Kappos
*Director of the United States Patent and Trademark Office*